United States Patent
Humphris

(10) Patent No.: US 10,254,306 B2
(45) Date of Patent: Apr. 9, 2019

(54) PROBE CALIBRATION OR MEASUREMENT ROUTINE

(71) Applicant: INFINITESIMA LIMITED, Abingdon (GB)

(72) Inventor: Andrew Humphris, Abingdon (GB)

(73) Assignee: INFINITESIMA LIMITED, Abingdon (GB)

( * ) Notice: Subject to any disclaimer, the term of this patent is extended or adjusted under 35 U.S.C. 154(b) by 162 days.

(21) Appl. No.: 14/647,991

(22) PCT Filed: Nov. 29, 2013

(86) PCT No.: PCT/GB2013/053172
§ 371 (c)(1),
(2) Date: May 28, 2015

(87) PCT Pub. No.: WO2014/083358
PCT Pub. Date: Jun. 5, 2014

(65) Prior Publication Data
US 2015/0301079 A1    Oct. 22, 2015

(30) Foreign Application Priority Data
Nov. 29, 2012   (GB) .................... 1221524.0

(51) Int. Cl.
   *G01Q 20/02*   (2010.01)
   *G01Q 40/00*   (2010.01)
   *G01B 9/02*    (2006.01)
(52) U.S. Cl.
   CPC ............... *G01Q 20/02* (2013.01); *G01B 9/02* (2013.01); *G01Q 40/00* (2013.01)
(58) Field of Classification Search
   CPC ......... G01Q 40/00; G01Q 30/06; G01Q 20/02
   See application file for complete search history.

(56) References Cited

U.S. PATENT DOCUMENTS 5,144,150 A    9/1992   Yoshizumi et al.
5,825,670 A *  10/1998  Chernoff ............... G01Q 40/00
                                                      315/317
(Continued)

FOREIGN PATENT DOCUMENTS

EP   1892727 A1   2/2008
EP   2336789 A1   6/2011
(Continued)

OTHER PUBLICATIONS

International Search Report dated Jan. 14, 2014 in International Application No. PCT/GB2013/053172, filed Nov. 29, 2013.
(Continued)

*Primary Examiner* — Brooke Purinton
(74) *Attorney, Agent, or Firm* — Pilloff & Passino LLP; Martin J. Cosenza

(57) ABSTRACT

A method of performing a measurement routine on a probe, the probe comprising a cantilever extending from a support. An interferometer is operated to reflect a sensing beam with the cantilever thereby generating a reflected sensing beam and combine the reflected sensing beam with a reference beam to generate an interferogram. The interferometer generates a first interference measurement value at a first measurement time by measuring the interferogram and a second interference measurement value at a second measurement time by measuring the interferogram, The cantilever deforms to form a different shape between the measurement times. A change in height of the probe between the measurement times is estimated in accordance with a difference between the first and second interference measurement values, and corrected in accordance with the difference in shape of the cantilever between the measurement times.

24 Claims, 5 Drawing Sheets

(56) References Cited

U.S. PATENT DOCUMENTS

| | | | | |
|---|---|---|---|---|
| 6,008,489 A | * | 12/1999 | Elings | G01Q 60/34 |
| | | | | 250/234 |
| RE36,488 E | * | 1/2000 | Elings | B82Y 35/00 |
| | | | | 250/234 |
| 6,189,374 B1 | | 2/2001 | Adderton et al. | |
| 6,678,056 B2 | | 1/2004 | Downs | |
| 2008/0047335 A1 | | 2/2008 | Kawasaki et al. | |
| 2008/0315092 A1 | * | 12/2008 | Kley | G01N 23/225 |
| | | | | 250/307 |
| 2009/0032706 A1 | * | 2/2009 | Prater | B82Y 35/00 |
| | | | | 250/307 |
| 2010/0235955 A1 | | 9/2010 | Humphris | |
| 2011/0138506 A1 | * | 6/2011 | Humphris | G01B 11/0608 |
| | | | | 850/6 |
| 2011/0247106 A1 | * | 10/2011 | Humphris | B82Y 35/00 |
| | | | | 850/6 |
| 2012/0042422 A1 | * | 2/2012 | Zhou | B82Y 35/00 |
| | | | | 850/1 |
| 2014/0026263 A1 | | 1/2014 | Humphris | |

FOREIGN PATENT DOCUMENTS

| | | |
|---|---|---|
| JP | 2008076221 A | 4/2008 |
| WO | 2009019513 A1 | 2/2009 |
| WO | 2009/147450 A1 | 12/2009 |
| WO | 2010/067129 A1 | 6/2010 |
| WO | 2012/104625 A1 | 8/2012 |

OTHER PUBLICATIONS

Written Opinion dated Jan. 14, 2014 in International Application No. PCT/GB2013/053172, filed Nov. 29, 2013.

* cited by examiner

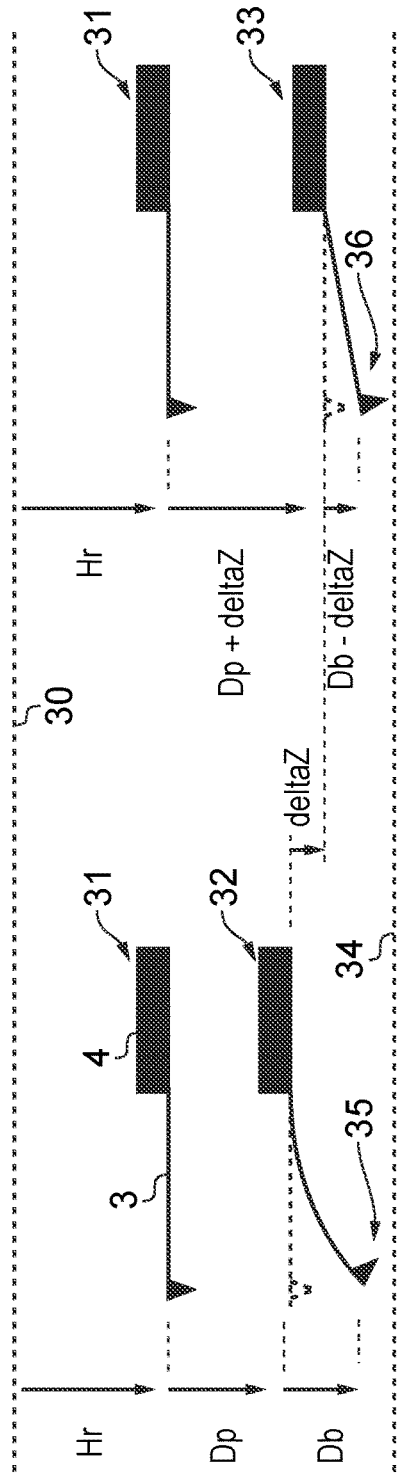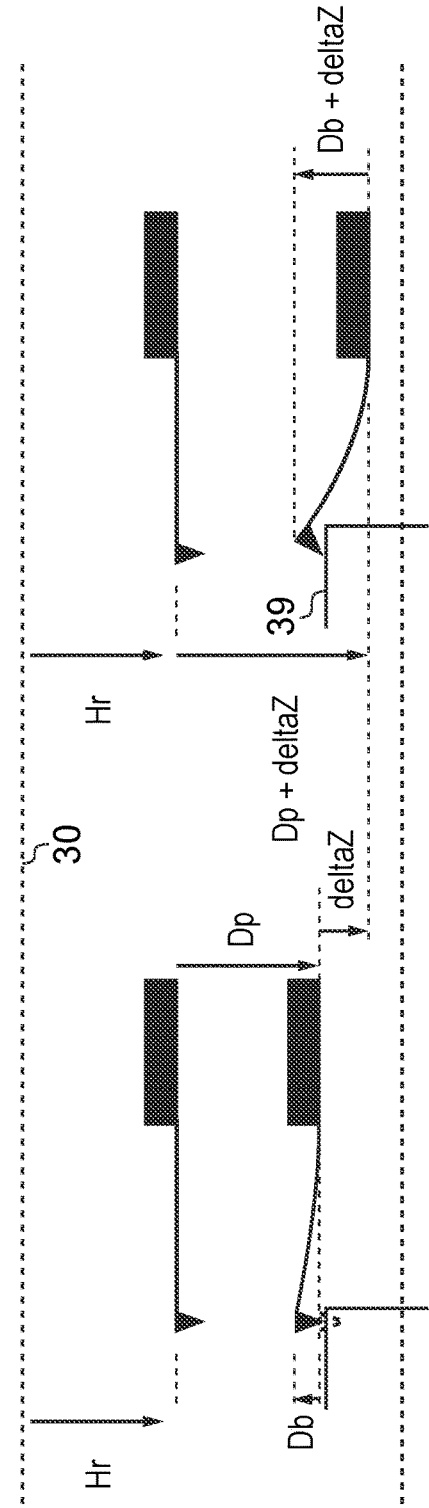
FIG. 3
FIG. 4

PROBE CALIBRATION OR MEASUREMENT ROUTINE

RELATED APPLICATIONS

The present application is a National Phase of International Application Number PCT/GB2013/053172, filed Nov. 29, 2013, and claims priority from Great Britain Application Number 1221524.0, filed Nov. 29, 2012.

FIELD OF THE INVENTION

The present invention relates to a method of performing a calibration or measurement routine on a probe, and apparatus for performing such a method.

BACKGROUND OF THE INVENTION

WO2012/104625 describes a scanning probe microscope comprising a probe that is mechanically responsive to a driving force. A signal generator provides a drive signal to an actuator that generates the driving force, the drive signal being such as to cause the actuator to move the probe repeatedly towards and away from a sample. An interferometer is arranged to output a height signal indicative of a change in path difference between light reflected from the probe and a height reference beam. Image processing apparatus is arranged to use the height signal to form an image of the sample.

Movement of the probe is accompanied by an angular deflection of the back surface of the cantilever which reflects the light into the interferometer. It has been assumed historically that this change of angle of the cantilever does not affect the height measured by the interferometer.

In a more conventional scanning probe microscope (unlike the microscope of WO2012/104625) the measurement of height change to the tip due to bending of the cantilever is not required, as a feedback system is used to maintain the cantilever at a constant deflection by adjusting the position of the base of the probe.

SUMMARY OF THE INVENTION

A first aspect of the invention provides a method of measuring a probe, the probe preferably comprising a cantilever extending from a support, the method comprising: arranging the probe in a pair of calibration positions, the probe (or cantilever) deforming relative to the support to form a different shape in the pair of calibration positions; operating an interferometer to reflect a sensing beam with the probe (or cantilever) at each calibration position thereby generating a reflected sensing beam, combine the reflected sensing beam with a reference beam to generate an interferogram, and generate an interference calibration value for each calibration position by measuring the interferogram; determining a deformation calibration value which is directly or indirectly indicative of an amount of deformation of the probe (or cantilever) between the calibration positions; and processing the interference calibration values and the deformation calibration value to generate a correction value.

A second aspect of the invention provides a method of measuring a probe, the probe preferably comprising a cantilever extending from a support, the method comprising: operating an interferometer to reflect a sensing beam with the probe (or cantilever) thereby generating a reflected sensing beam, combine the reflected sensing beam with a reference beam to generate an interferogram; generate a first interference measurement value at a first measurement time by measuring the interferogram, and generate a second interference measurement value at a second measurement time by measuring the interferogram, wherein the probe (or cantilever) deforms to form a different shape between the measurement times; estimating a change in height of the probe between the measurement times in accordance with a difference between the first and second interference measurement values, and correcting the estimated change in height in accordance with the difference in shape of the probe (or cantilever) between the measurement times.

Historically it has been assumed that the change in height is given by the difference between the first and second interference measurement values, or alternatively the microscope is operated in a mode in which the angle of the cantilever relative to the interferometer is maintained constant by adjusting the position of the base of the probe with a feedback system. The present invention applies a correction in accordance with the difference in shape of the cantilever between the measurement times.

The first aspect of the invention provides a calibration routine to generate a correction factor, and the second aspect of the invention provides a measurement routine which applies such a correction factor to an actual measurement. The first and second aspects of the invention may be combined: that is, the calibration routine may be performed before, during, and/or after the measurement routine in order to determine the correction value which is applied in the measurement routine.

The probe may comprise any structure which deforms relative to the sensing beam between the calibration positions or measurement times. Preferably the probe comprises a cantilever extending from a support, but other probe structures may also be used. The cantilever typically extends along its length from a proximal end near the support to a distal end remote from the support. Deforming the cantilever relative to the support may comprise bending it along its length, or twisting it about its length.

Typically the change in height is estimated by: determining a deformation measurement value which is directly or indirectly indicative of the amount of deformation of the probe (or cantilever) between the measurement times; and determining the change in height between the measurement times in accordance with the difference between the first and second interference measurement values, the deformation measurement value, and a correction value.

The deformation measurement value may be determined in a number of ways. In one example the support is moved between the measurement times, and determining the deformation measurement value comprises determining a change of height of the support caused by said movement of the support. Alternatively the deformation measurement value may be determined by directly measuring a change of deflection angle of the probe (or cantilever) relative to the interferometer. Such a direct measurement of deflection angle can be achieved for example by reflecting a light beam off the probe, and directing the reflected light beam onto a position sensitive detector of split photodiode which provides an output indicative of the angle of the reflected light beam. Another direct measurement of deflection angle can be achieved by operating two interferometers to measure the height of the probe at two points, and using the height difference between the points to calculate the angle.

Typically the probe interacts with a sample on a stage. In this case the height between the support and the stage may change between the measurement times due to movement of the support and/or movement of the stage. In this case the deformation measurement value can be determined by measuring the change in height caused by movement of the stage and/or movement of the support. From this known change in height, it is then inferred that any further change between the first and second interference measurement values is caused entirely be deformation of the probe (or cantilever).

The change in height of the probe between the pair of measurement times may be estimated in accordance with the algorithm:

$$deltaS=(1/k)*(deltaHm+(k-1)*deltaZ); \text{ or}$$

$$deltaS=(1/k)*(deltaHm)-deltaZ$$

where:
deltaS is the estimated change in height between the pair of measurement times;
k is a correction value;
deltaHm is the difference between the first and second interference measurement values; and
deltaZ is a change in height of the support between the pair of measurement times (which may optionally be zero if the height of the support does not change between the measurement times).

The probe may be used in a number of applications, including (but not limited to): scanning probe microscopy, for example for biological research; materials science research; industrial inspection such as semiconductor mask and wafer inspection and review; biosensing to detect multiple biomarkers; nanolithography, such as dip pen nanolithography in which a scanning probe deposits chemical compounds on a substrate; or data storage in which the probe has a heater allowing its temperature to be independently raised to melt a polymer substrate followed by an imprinting action by the probe producing a dent representing a binary digit.

The probe (or cantilever) may be deformed by an actuation device, such as (but not limited to) a piezoelectric actuator or resistive heater integrated into the probe (or cantilever), a light source which illuminates the probe (or cantilever) and causes it to heat and deform by the photothermal effect, or a field source which generates an electric or magnetic field which acts on the probe (or cantilever) which is adapted to be responsive to such fields. Alternatively the probe (or cantilever) may deform passively by bending up and down as it follows a surface.

A further aspect of the invention provides apparatus for measuring a probe, the probe preferably comprising a cantilever extending from a support, the apparatus comprising: an interferometer which is operable to reflect a sensing beam with the probe (or cantilever) thereby generating a reflected beam, combine the reflected beam with a reference beam to generate an interferogram, and generate an interference value by measuring the interferogram; and a processor which is programmed to operate the interferometer and process the interference values to perform the method of the first and/or second aspect of the invention.

Optionally the apparatus further comprises an actuator which is operable to change a height of the support, or a height of a stage on which a sample is mounted.

The apparatus may further comprise an actuation device for deforming the probe (or cantilever), such as a piezoelectric actuator integrated into the cantilever, a light source which illuminates the cantilever and causes it to heat and deform by the photothermal effect, or a field source which generates an electric or magnetic field which acts on the probe (or cantilever) which is adapted to be responsive to such fields.

Typically the cantilever (for use in any of the above aspects of the invention) has a length from the support to a distal end of the cantilever which is less than 50 µm and most preferably less than 20 µm.

BRIEF DESCRIPTION OF THE DRAWINGS

Embodiments of the invention will now be described with reference to the accompanying drawings, in which:
FIG. 3 shows a first calibration routine performed using the microscope of FIG. 1;
FIG. 4 shows a second calibration routine.

DETAILED DESCRIPTION OF EMBODIMENT(S)

Figure 1:
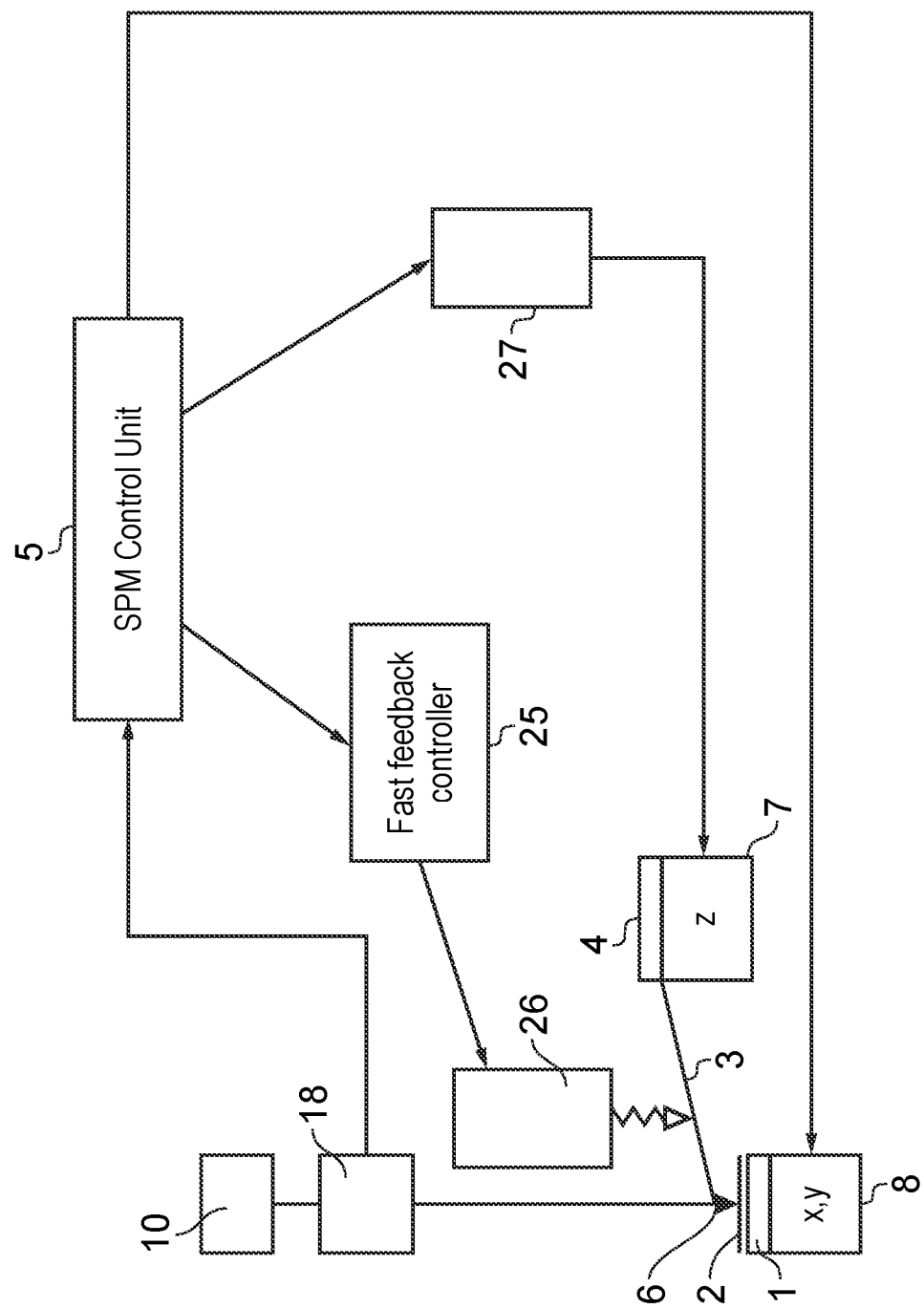
FIG. 1 is a schematic view of a probe microscope.

FIG. 1 shows a probe microscope comprising a moveable stage 1 adapted to receive a sample 2, whose surface is to be investigated by a thermal bimorph probe. The probe comprises a cantilever 3 extending from a support 4. Scanning capability is provided by two conventional drive systems: x,y scanners 8 are operable by a controller 5 to provide relative motion of the stage 1 in the plane (x, y) of the sample; and a piezoelectric driver 7 is operable to move the support 4 towards and away from the sample (z direction) over ranges larger than that achievable by the thermal bimorph actuation of the probe.

The cantilever 3 carries a conical or pyramidal tip 6, which tapers to a point and is located towards a distal end of the cantilever 3. In this embodiment, the z-positioning system 7 is connected to the probe support 4. Alternatively, it may be connected to the sample stage 1.

The probe is generally fabricated from silicon or silicon nitride. Typically, the cantilever 3 is around 50-200 µm long, 20-50 µm wide and around 0.2-2 µm thick, but this size can of course be varied according to application. The shape may also be varied: typically it is rectangular or triangular with, in the latter case, the tip in the vicinity of its apex. The tip 6 is typically 5 µm at its base, 3-10 µm high and with an end radius of curvature of 2-20 nm. In use, the fine point at the end of the tip is oriented towards the sample 2. Recently, smaller dimension probes have been fabricated for use at faster imaging speeds. These probes have cantilevers around 5-20 µm long and 3-10 µm wide, with a correspondingly smaller tip.

Figure 2:
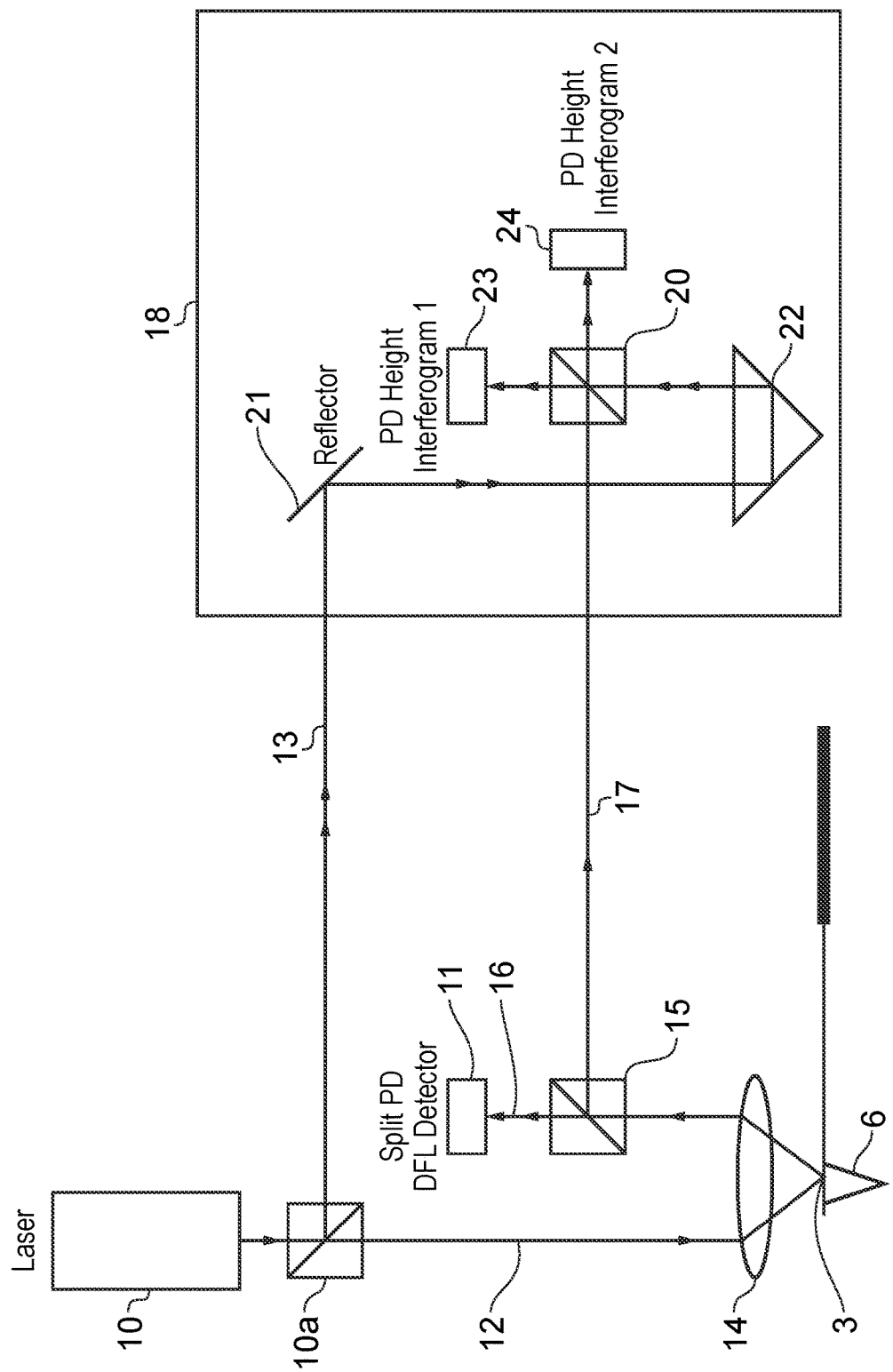
FIG. 2 shows the interferometer and position sensitive detector of the microscope.

Referring to FIG. 2, a light source 10 is arranged to emit a light beam which is directed onto an upper surface (back) of the cantilever 3 at the end at which the tip 6 is mounted. Light reflected from the back of the cantilever propagates to a device which measures the beam position, typically a position sensitive detector (PSD) 11, or a split or quadrant photodiode, which generates an output that is representative of the deflection angle of the cantilever 3.

Light from the source 10 is split by a beam splitter 10a into an incident beam 12 and a reference beam 13. The incident beam 12 is focused by an objective lens 14 onto the back of the cantilever. After reflection from the cantilever, the reflected beam is split by a first beam splitter 15. A first component 16 is directed to the deflection detector 11 and a second component 17 is directed to an interferometer height detector 18.

Figure 5:
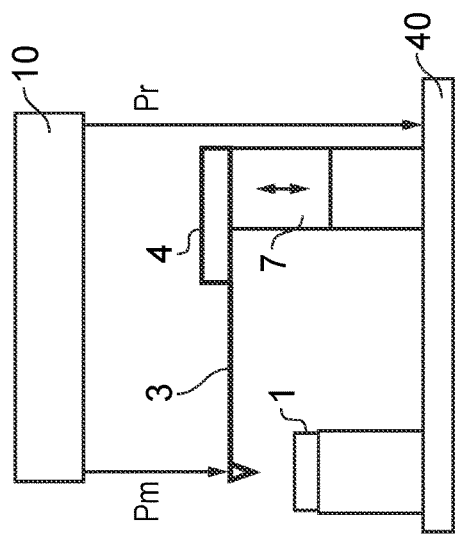
FIGS. 5-8 are schematic views of four different microscope arrangements.

Inside the interferometer height detector 18, the beam 17 that has been reflected from the cantilever is split by a beam splitter 20. The reference beam 13 is directed from a reflector 21 onto a retro-reflector 22 and thereafter to the beam splitter 20. The retro-reflector 22 is aligned such that it provides a fixed optical path length which does not change as the vertical (z) position of the support 4 is changed by operation of the piezoelectric driver 7. FIG. 5 is a schematic view of the microscope of FIG. 1 which illustrates this principle. The support 4 and stage 1 are each mounted on a base 40, and the retro-reflector 22 is mounted so that it does not move relative to the base 40 as the support 4 moves. FIG. 5 also shows optical paths Pm and Pr which schematically represent the optical path lengths of the measurement beam (Pm) reflected from the cantilever 3 and the reference beam (Pr).

The beam splitter 20 has an energy absorbing coating and splits both incident 17 and reference 13 beams to produce first and second interferograms with a relative phase shift of 90 degrees. The two interferograms are detected respectively at photodetectors 23, 24.

Ideally, the photodetector signals are complementary sine and cosine signals with a phase difference of 90 degrees. Further, they should have no dc offset, have equal amplitudes and only depend on the position of the cantilever and wavelength of the laser 10. Known methods are used to monitor the outputs of the photodetectors 23, 24 while changing the optical path difference in order to determine and to apply corrections for errors arising as a result of the two photodetector signals not being perfectly harmonic, with equal amplitude and in phase quadrature. Similarly, dc offset levels are also corrected in accordance with methods known in the art.

These photodetector signals are suitable for use with a conventional interferometer reversible fringe counting apparatus and fringe subdividing apparatus, which may be provided as dedicated hardware or as a programmed computer. Phase quadrature fringe counting apparatus is capable of measuring displacements in the position of the cantilever to an accuracy of $\lambda/8$. That is, to 66 nm for 532 nm light. Known fringe subdividing techniques, based on the arc tangent of the signals, permit an improvement in accuracy to the nanometer scale or less.

Interferometric methods of extracting the path difference between two coherent beams are well known in the art and so will not be described in any further detail.

The interferometer described herein is one example of a homodyne system. The particular system described offers a number of advantages to this application. The use of two phase quadrature interferograms enables the measurement of cantilever displacement over multiple fringes, and hence over a large displacement range. The use of a phase-shifting coating on the beamsplitter 20 reduces the interferometer sensitivity to polarisation effects, for example arising from changes in polarisation as the light beam is reflected from the cantilever. Examples of an interferometer based on these principles are described in U.S. Pat. No. 6,678,056 and WO2010/067129. Alternative interferometer systems capable of measuring a change in optical path length may also be employed with this invention, for example, a homodyne interferometer could be implemented using polarization methods to generate the two phase quadrature interferograms or a heterodyne interferometer implemented by using a dual frequency laser. A suitable homodyne polarisation interferometer is described in EP 1 892 727 and a suitable heterodyne interferometer is described in U.S. Pat. No. 5,144,150 which could be adapted for use with this invention.

The height information extracted by the detection system 18 ideally represents the true instantaneous height of the probe in the z direction. This is ideally independent of the position of the base of the probe relative to the tip i.e. of the shape of the cantilever relative to the support 4.

Returning back to FIG. 1—probe cyclic motion is generated by a fast feedback controller 25 which controls an illuminator 26 that directs light with an intensity variation set by the controller 25 onto the cantilever 3. The cantilever 3 is a thermal biomorph structure, the materials of which undergo differential expansion when heated. That is, the cantilever 3 is composed of two (or more) materials, with differing thermal expansions. Typically, this will be a silicon or silicon nitride base with a gold or aluminium coating. The coating extends the length of the cantilever and covers the reverse side from the tip. The illuminator 26 preferably emits light of one or more wavelengths at which there is a maximum or peak in the absorption spectrum for the particular coating. For example the wavelength may be around the aluminium absorption peak at ~810 nm. Other coating/wavelength combinations can be used, for example gold has a higher absorption below 500 nm light. When this light is incident on the coating side of the cantilever, the aluminium expands to a greater degree than the silicon nitride, bending the cantilever such that the tip moves downwards, towards the sample. If illumination intensity is increased, the tip therefore moves closer to the sample surface. Conversely, if the intensity is lowered, bending is decreased and the tips are moved away from the sample. Other arrangements of coating and base materials may result in bending in an opposite direction in response to illumination.

The result of the differing thermal expansion of the bimorph materials is a flexural movement of the probe in an essentially vertical (z) direction towards and away from the sample.

The operation of the microscope will now be described based on a mode of operation described in further detail in WO2012/104625. However other modes of operation are possible.

During the course of a measurement the probe is cycled by the illuminator 25 and moved towards the sample 2 until the sample is detected, at which point the probe is retracted and the height recorded at the point of surface detection. An image of the surface height is then created by repeating this process while moving the probe under control of the x,y drivers 8, generally following a raster pattern although any x,y sequence could be followed. The z positioning system 7 controls the height of the support 4 above the surface and is operated to maintain the probe cyclic amplitude at a set average level, where the "probe cyclic amplitude" is the height difference for each cycle between the fully retracted position and the point of surface detection.

The amplitude of the probe cycles in the height signal can be extracted by the control unit 5 and used as the parameter on which to determine the z adjustments. The output from the control unit 5 is input to a slow feedback controller 27, which instructs adjustment of the z position drive 7, which in turn moves the support 4, to return the amplitude of probe cycle to its set point.

The probe velocity, or equivalently rate of change of the height signal, will fall as the tip encounters and begins to interact with the surface. An indication of the surface position is therefore extracted from the point within each cycle at which its rate of change falls below a threshold level for a set period of time. This provides a measure of surface height at the probe's x,y position that can be used to construct an image. Each data point is mapped to the scan x,y position and so forms a point or pixel on the image.

Since the cantilever 3 bends to achieve z actuation, displacement is always accompanied by an angular deflection of the back surface of the cantilever. It has been discovered by experiment that the angle of the cantilever 3 affects the height measured by the interferometer 18 and it is desirable that this be corrected. This problem has not previously been recognised in the probe microscopy literature, and is of particular importance when the bending of the cantilever is used to control the tip position. The magnitude of the artefact depends on cantilever geometry and is more pronounced for shorter cantilevers (length <50 µm or <20 µm).

A method of correcting the output of the interferometer 18 for such artefacts to generate a more accurate estimate of the height of the probe will now be described with reference to FIGS. 3-6.

First a calibration measurement routine is performed on the probe using one of the calibration methods shown in FIG. 3 or 4. The FIG. 3 method will be described first. The calibration routine is performed by positioning the probe above a surface 34 with the support 4 at a first probe support calibration position 32 which is within the range of the cantilever bending. The cantilever is then actuated by the illuminator 26 so that it bends down (while remaining fixed in X and Y) until the tip of the probe interacts with the surface as indicated at 35. This provides a first probe tip calibration position.

The point of interaction at the first probe tip calibration position 35 can be detected by a number of methods, for example, as previously described by monitoring probe velocity or by oscillating the cantilever at resonance and monitoring the amplitude or phase of the oscillation of the output of the interferometer as the tip interacts with the surface. The interferometer signal at the point of interaction 35 is then output as Hm1 and the cantilever is retracted by turning off the illuminator 26. The next cycle of measurement begins with movement of the support by deltaZ, and the process is repeated to generate Hm2 which is the output of the interferometer when the probe tip interacts with the sample surface at 36 (a second probe tip calibration position).

Referring to the left-hand side of FIG. 3, at the first probe tip calibration position 35 the height of the distal end of the cantilever 3 relative to a fixed reference height 30 is:

$$Hr+Dp+Db$$

where Hr is a constant offset from the reference height 30, Dp is a difference in height of the support 4 between a reference position 31 and the first probe support calibration position 32, and Db is a change in height caused by bending of the cantilever.

The height Hm1 measured by the interferometer 18 relative to the reference height 30 is:

$$Hm1=Hr+Dp+k*Db$$

where k is an unknown correction value.

Next the probe support 4 is moved to a second probe support calibration position 33 (shown on the right-hand side of FIG. 3) by operating the z piezoelectric driver 7. The height of the distal end of the cantilever 3 relative to the reference height 30 is now:

$$Hr+(Dp+\text{deltaZ})+(Db-\text{deltaZ})$$

where deltaZ is the known change in height of the support 4 between the pair of probe support calibration positions 32,33. DeltaZ can be inferred indirectly by the size of the drive signal from the slow feedback controller 27 into the piezoelectric driver 7, or could be measured more directly by a sensor (not shown) such as a strain gauge, capacitance gauge or linear variable differential transformer (LVDT) gauge coupled to the driver 7, or a second interferometer (not shown) which reflects a sensing beam off the driver 7 or support 4.

Note that the cantilever has a different shape in the pair of calibration positions: in other words it is more bent in the first position 32/35 than in the second position 33/36. Thus the known height change deltaZ of the support 4 between the calibration positions provides a reference calibration value which is indirectly indicative of the amount of bending (and change of angle) of the cantilever 3 relative to the support 4 between these calibration positions.

Note that in FIG. 3 the support 4 is moved to the right between the first and second calibration position 35, 36 to make the drawing more clear, but the support 4 may instead be at the same lateral position relative to the sample in both positions (only the vertical position of the support 4 being changed between the two calibration positions).

The height Hm2 measured by the interferometer with the probe tip in the second probe tip calibration position 36 is:

$$Hm2=Hr+Dp+\text{deltaZ}+k*(Db-\text{deltaZ})$$

Thus if we assume that the height of the surface 34 does not change between the pair of calibration positions, then the measured change in height Hm1-Hm2 from the interferometer is:

$$Hm1-Hm2=k*Db-\text{deltaZ}-k*(Db-\text{deltaZ})=-\text{deltaZ}+k*\text{deltaZ}=\text{deltaZ}(k-1)$$

and the control unit 5 can process the interference calibration values (Hm1 and Hm2) and the deformation calibration value (deltaZ) to generate the correction value as:

$$k=1+(Hm1-Hm2)/\text{deltaZ}$$

Thus the equation above establishes the relationship between an apparent change in the height measured via the interferometer (Hm–Hm2), and the change in height of the cantilever relative to the support (deltaZ) which is due to bending. If the measured heights were independent of the bending of the cantilever then Hm1=Hm2 and k=1. However for a 20 µm long cantilever, k is typically between 0.5 and 0.8, but this is dependent on the details of the particular instrument.

In theory the correction value k can be determined from the calibration routine described above with only a pair of calibration positions as shown, but more typically a larger dataset is acquired by repeating the process with further values of deltaZ and then using a curve fitting routine. In fact, the correction value k may not be a constant but may be a function of the bending of the cantilever, however, for small levels of bending it is sufficient and simpler to consider k to be a constant and independent of the bending of the cantilever.

FIG. 4 shows a second calibration routine. In this case the support 4 is moved down until the tip of the probe interacts with a surface 39, and the output Hm1 of the interferometer is recorded. In this example the cantilever is shown as being bent upwards slightly in this first calibration position, although it may be unbent. Next the probe support 4 is moved down below the surface 39 to a second calibration position (shown on the right-hand side of FIG. 4) by operating the z piezoelectric driver 7 whilst keeping the tip in contact with the surface 39. This causes the cantilever to bend upwardly relative to the support 4. The known height change deltaZ provides a reference calibration value which is indirectly indicative of the amount of upward bending of the cantilever between these two calibration positions, and can be used along with Hm1 and Hm2 to calculate the correction factor k as:

$$k=1+(Hm1-Hm2)/\text{deltaZ}$$

which agrees with the relationship previously determined for FIG. 3.

In the calibration routines shown in FIGS. 3 and 4 the support 4 is moved down to generate the known height change deltaZ between the calibration positions. Alternatively a known height change may be generated by moving the stage 1 on which the sample is mounted up instead of moving the support 4 down. In other words the z piezoelectric driver 7 may move the stage 1 up by a distance deltaZ rather than moving the support 4 down. This is shown schematically in FIG. 6 in which the driver 7 is placed between the stage 1 and the base 40. In this case, if the stage 1 is moved up by a distance deltaZ then the correction factor k is given by:

$$k=(Hm2-Hm1)/\text{deltaZ}$$

Of course a known height change may also be generated by a combination of downward movement of the support 4 and upward movement of the stage 1.

Figure 6:
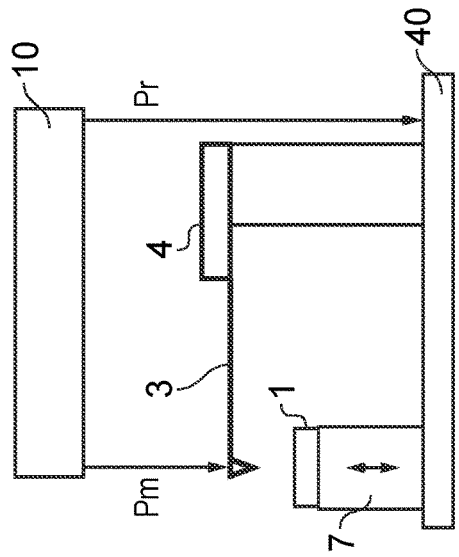
Figure 7:
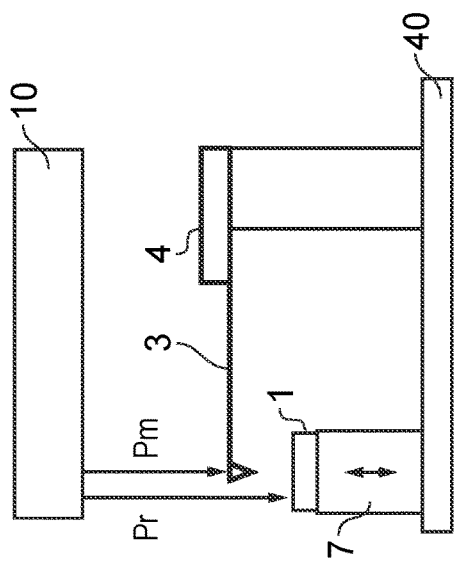

Furthermore, instead of providing an interferometer reference beam 13 with a fixed optical path length Pr which does not change as the vertical (z) position of the stage 1 changes (as in FIG. 6), the retro-reflector 22 may instead be linked to the stage 1 so that the optical path length Pr of the reference beam 13 changes as the vertical (z) position of the stage 1 changes (as in FIG. 7). In the case of FIG. 7 the correction factor k is given by:

$$k=1+(Hm1-Hm2)/\text{deltaZ}$$

as with the embodiment of FIG. 5.

Alternatively, the relationship between the retro-reflector 22 and the stage 1 does not have to be fixed as in FIG. 7. In such an embodiment the retro-reflector 22 may have a known (but varying) relationship with the z position of the stage 1.

Figure 8:
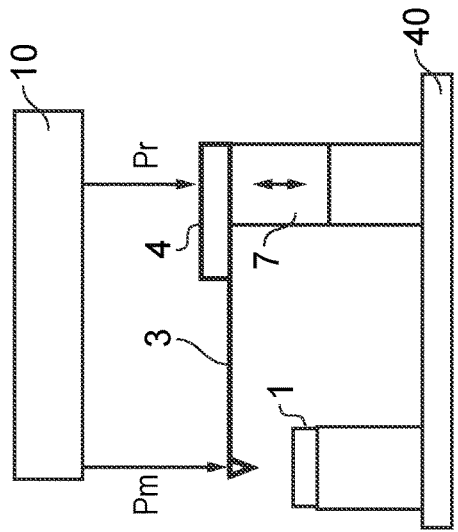

FIG. 8 illustrates a further alternative embodiment in which the retro-reflector 22 is fixed to the support 4 (or otherwise linked with the motion of the support 4) so that the reference optical path length Pr changes as the support moves up and down. In this case, if the support 4 is moved down by a distance deltaZ then the correction factor k is given by:

$$k=(Hm2-Hm1)/\text{deltaZ}$$

as with the embodiment of FIG. 6.

The interferometer measures changes in optical path length difference between the measurement path Pm and the reference path Pr. The interferometers of FIGS. 5 and 7 measure changes in the optical path length difference due to both the bending of the cantilever 3 and the displacement of the support/stage, whereas the interferometers of FIGS. 6 and 8 measure only changes in the optical path length difference due to the bending of the cantilever. The change in optical path length difference which is measured by the interferometer is used to indicate the change in height of the free end of the cantilever and thus the tip.

In a further alternative calibration routine (not shown), a calibration sample may be provided with a step of known height, the two sides of the step providing the first and second calibration positions during the calibration measurement routine.

Figure 9:
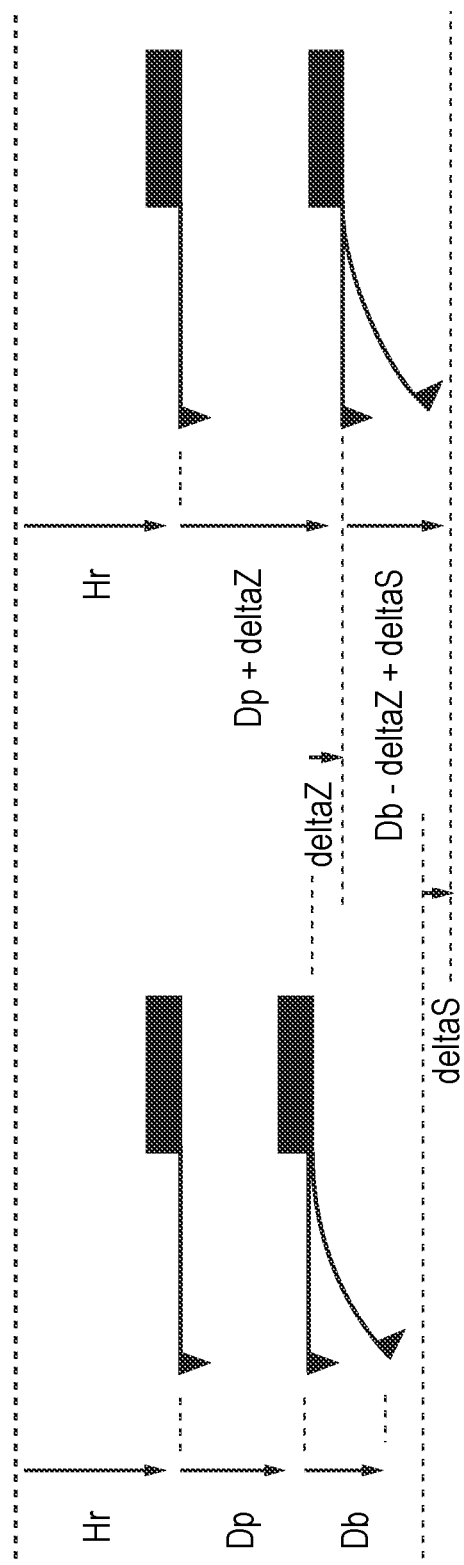
FIG. 9 shows a measurement routine performed using the microscope of FIG. 1.

FIG. 9 illustrates a method of measuring a height of the probe during an imaging process using the microscope configuration of FIG. 5. FIG. 9 shows the probe imaging a surface with a step change deltaS in height. In the case of the imaging process described in WO2012/104625, then two measurement routines are performed in FIG. 9, one on either side of the step. In the case of a more conventional feedback process, the probe can be scanned (by operation of the xy driver 8 moving the sample) between the two positions on either side of the step with a feedback loop operating and maintaining a set point of constant force or force gradient, depending on the details of the imaging mode. A similar correction process is applicable in both cases, although the exact value of deltaZ will vary depending on the details of the control methodology.

The change deltaS in height of the surface (and the probe tip) across the step is:

$$\text{deltaS}=(1/k)*((Hm2-Hm1)+(k-1)*\text{deltaZ})$$

where deltaZ is the known change in height of the support 4 between the two measurement times, k is the correction value obtained by calibration, and Hm1, Hm2 are the interferometer outputs for the two measurement times.

With the optical set-up of FIG. 7 the expression for deltaS is the same. However with the arrangement of FIGS. 6 and 8, deltaS is instead given by:

$$\text{deltaS}=(1/k)*(Hm2-Hm1)-\text{deltaZ}$$

In the procedure shown in FIG. 9, the probe is actively driven by the illuminator 26 into contact with the surface, either intermittently contacting the surface as described in WO2012/104625 or constantly in contact with the surface with a feedback loop operating and maintaining a set point of constant force or force gradient. However the present invention is applicable to other modes of operation—for instance the probe may be constantly in contact with the surface but instead of being actively bent up and down by the illuminator 26 to follow the profile of the surface, the surface itself may provide the force which causes the probe to bend up and down (so no active probe actuation is required). Bending of the probe, optionally in combination with adjustments to the base position of the probe, may be controlled using a feedback system as described for example in U.S. Pat. No. 6,189,374.

An imaging procedure typically begins with a calibration process to determine k for a given probe and microscope setup, and then the image data (deltaZ and Hm) is acquired for a matrix of x,y values using that same probe. The final image is then corrected using the above equation, the correction value k being indicative of the errors in the interference measurement values (Hm) caused by deformation of the cantilever. The correction could be applied in real time, for example, if the height from the interferometer is used as part of a control system or if the real time display of a corrected image is required.

Failure to correct for k will result in the movement of the piezoelectric device 7 feeding through into the image data (as a second term) while the image height data will also be incorrect even if the piezoelectric device 7 does not move (as a first term).

The calibration process of FIGS. 3 and 4 could be performed some time before or after the measurement routine of FIG. 9. Optionally a manufacturer of the microscope of FIG. 1 could operate the microscope to perform one of the calibration processes of FIGS. 3 and 4 and store the correction factor k. The manufacturer can then supply the calibrated microscope to an end user who operates the microscope to perform the measurement routine of FIG. 9 using the previously stored correction factor k. Alternatively the end user may operate the microscope to perform one of the calibration processes of FIGS. 3 and 4 and also the measurement routine of FIG. 9.

It has been observed that the value of k changes between images and it is therefore preferable to calibrate k multiple times. The calibration procedure may be performed before the image data (deltaZ and Hm) is acquired for a matrix of x,y values, and/or after the matrix of image data has been acquired, and/or during acquisition of the matrix of image data. In the latter case the calibration procedure can be performed by imparting a known and preferably repetitive change to deltaZ (by moving the support 4 or the sample) during image acquisition which would create a correlated change in the output of the interferometer. The variation in deltaZ and the related change in interferometer output could then be used to perform the calibration.

In another example where calibration and imaging are integrated into a single process—a sample with at least some known features of known height (such as trenches of known depth, or raised features of known height) or known gradient (such as a saw tooth structure with a known gradient) is scanned and the data from these features (such as the measured depth of the trench, the measured height of the raised features, or the measured gradient of the saw tooth structure) is used to determine the correction factor k.

Alternatively a sample with at least some features of known geometry can be scanned—such as a flat horizontal region, or a trench with a base which is parallel to the surface on either side of the trench. The image of the flat region may be curved or not horizontal, and this error in the image can be analysed to determine the correction factor k. For instance the correction factor k for the image might be continuously varied in time, and the corrected image observed until the region appears both flat and horizontal. Similarly the image of the base of the trench may not be parallel to the image of the surface on either side of the trench, and this error in the image can be used to determine the correction factor k.

Although the invention has been described above with reference to one or more preferred embodiments, it will be appreciated that various changes or modifications may be made without departing from the scope of the invention as defined in the appended claims.

The invention claimed is:

1. A method of measuring a probe, the method comprising:
   a. arranging the probe in a pair of calibration positions, the probe deforming relative to a support to form a different shape in the pair of calibration positions;
   b. operating an interferometer to reflect a sensing beam with the probe at each calibration position thereby generating a reflected sensing beam, combine the reflected sensing beam with a reference beam to generate an interferogram, and generate an interference calibration value for each calibration position by measuring the interferogram;
   c. determining a deformation calibration value which is directly or indirectly indicative of an amount of deformation of the probe between the calibration positions;
   d. processing the interference calibration values and the deformation calibration value to generate a correction value and storing the correction value; and
   e. acquiring measurement data by:
      e1. operating an interferometer to reflect a sensing beam with the probe thereby generating a reflected sensing beam, combine the reflected sensing beam with a reference beam to generate an interferogram; generate a first interference measurement value at a first measurement time by measuring the interferogram, and generate a second interference measurement value at a second measurement time by measuring the interferogram, wherein the cantilever deforms to form a different shape between the measurement times;
      e2. estimating a change in height of the probe between the measurement times in accordance with a difference between the first and second interference measurement values, and
      e3. correcting the estimated change in height in accordance with the previously stored correction value,
   wherein the probe interacts with a sample at each measurement time, and the method further comprises estimating a change in height of the sample in accordance with the estimated change in height of the probe.

2. The method of claim 1 wherein the probe comprises a cantilever extending from a support, the cantilever deforming relative to the support to form the different shape in the pair of calibration positions, the interferometer is operated to reflect the sensing beam with the cantilever at each calibration position, and the deformation calibration value is directly or indirectly indicative of an amount of deformation of the cantilever between the calibration positions.

3. The method of claim 2 wherein the cantilever extends along its length from a proximal end near the support to a distal end remote from the support, and wherein deforming the cantilever relative to the support comprises bending it along its length.

4. The method of claim 1 wherein the estimated change in height is corrected in accordance with the algorithm:

$$\text{delta}S = (1/k)*(\text{delta}Hm + (k-1)*\text{delta}Z); \text{ or}$$

$$\text{delta}S = (1/k)*(\text{delta}Hm) - \text{delta}Z$$

where:
deltaS is the estimated change in height between the measurement times;
k is the correction value;
deltaHm is the difference between the first and second interference measurement values; and
deltaZ is a change in height of the support between the pair of measurement times.

5. The method of claim 1, wherein the interference calibration values and the deformation calibration value are processed to generate the correction value as:

$$k = 1 + (A/B); \text{ or}$$

$$k = A/B$$

where:
k is the correction value;
A is a difference between the interference calibration values; and
B is the deformation calibration value.

6. A method of measuring a probe, the method comprising:
a. operating an interferometer to reflect a sensing beam with the probe thereby generating a reflected sensing beam, combine the reflected sensing beam with a reference beam to generate an interferogram; generate a first interference measurement value at a first measurement time by measuring the interferogram, and generate a second interference measurement value at a second measurement time by measuring the interferogram, wherein the probe deforms to form a different shape between the measurement times;
b. estimating a change in height of the probe between the measurement times in accordance with a difference between the first and second interference measurement values, and
c. correcting the estimated change in height in accordance with the difference in shape of the probe between the measurement times,
wherein the probe interacts with a sample at each measurement time and is retracted away from the sample between the measurement times so that the probe intermittently contacts the sample, and the method further comprises estimating a change in height of the sample in accordance with the estimated change in height of the probe.

7. The method of claim 6 comprising:
determining a deformation measurement value which is directly or indirectly indicative of the amount of deformation of the probe between the measurement times; and
determining the change in height between the measurement times in accordance with the difference between the first and second interference measurement values, the deformation measurement value, and a correction value.

8. The method of claim 7 wherein the probe interacts with a sample on a stage at the first and second measurement times, and wherein determining a deformation measurement value comprises determining a change of height between the support and the stage between the measurement times.

9. The method of claim 7 wherein the support is moved between the measurement times, and wherein determining a deformation measurement value comprises determining a change of height of the support caused by said movement of the support.

10. The method of claim 1 further comprising constructing an image of the sample in accordance with the estimated change in height of the sample.

11. The method of claim 6 wherein the change in height between the pair of measurement times is estimated in accordance with the algorithm:

$$deltaS = (1/k)*(deltaHm+(k-1)*deltaZ); \text{ or}$$

$$deltaS = (1/k)*(deltaHm)-deltaZ$$

where:
deltaS is the estimated change in height between the pair of measurement times;
k is a correction value;
deltaHm is the difference between the first and second interference measurement values; and
deltaZ is a change in height of the support between the pair of measurement times.

12. The method of claim 6 wherein the probe comprises a cantilever extending from a support, the cantilever deforming relative to the support to form the different shape between the measurement times, the interferometer is operated to reflect the sensing beam with the cantilever thereby generating the reflected beam, and the estimated change in height is corrected in accordance with the difference in shape of the cantilever between the measurement times.

13. Apparatus for measuring a probe, the apparatus comprising:
a. an interferometer which is operable to reflect a sensing beam with the probe thereby generating a reflected beam, combine the reflected beam with a reference beam to generate an interferogram, and generate interference values by measuring the interferogram; and
b. a processing system which is programmed to operate the interferometer and process the interference values in accordance with the method of claim 1.

14. The apparatus of claim 13 further comprising a radiation source which is arranged to illuminate the probe and cause it to heat and deform.

15. The method of claim 1 wherein the action of generating the correction value occurs before or after acquiring the measurement data.

16. The method of claim 1 wherein the action of generating the correction value occurs while acquiring the measurement data, wherein a known change in height of the support is imparted during the action of acquiring the measurement data to create a correlated change in an output of the interferometer.

17. The method of claim 1 wherein the acquired measurement data is acquired by moving the probe through a range of movements before or after action "a."

18. The method of claim 1 wherein the probe is a thermal bimorph probe.

19. A method of measuring a probe, the method comprising:
a. arranging the probe in at least two respective calibration positions, the probe respective deforming relative to a support that supports the probe to form a different shape in the respective calibration positions;
b. generating respective calibration values for at least two respective calibration positions of the at least two of respective calibration positions;
c. determining a deformation calibration value which is directly or indirectly indicative of an amount of deformation of the probe between the calibration positions;
d. processing the respective calibration values and the deformation calibration value to generate a correction value and storing the correction value; and
e. acquiring measurement data by:
e1. operating an interferometer to reflect a sensing beam with the probe thereby generating a reflected sensing beam, combining the reflected sensing beam with a reference beam to generate an interferogram, generating a first interference measurement value at a first measurement time by measuring the interferogram, and generate a second interference measurement value at a second measurement time by measuring the interferogram, wherein the cantilever deforms to form a different shape between the measurement times;
e2. estimating a change in height of the probe between the measurement times in accordance with a difference between the first and second interference measurement values, and
e3. correcting the estimated change in height in accordance with the previously stored correction value,
wherein the probe interacts with a sample at each measurement time, and is retracted away from the sample between the measurement times so that the probe intermittently contacts the sample, and the method further comprises estimating a change in height of the sample in accordance with the estimated change in height of the probe.

20. The method of claim 19, wherein the generated respective calibration values are generated respective interference calibration values, and wherein action "b" includes operating an interferometer to reflect respective sensing beams with the probe at each respective calibration positions, thereby generating a reflected sensing beam, combining the reflected sensing beam with reference beam to generate an interferogram, and generating the respective interference calibration values by measuring the respective interferogram.

21. The method of claim 20, wherein action a includes arranging the probe in at least two respective calibration positions by placing the probe at a first position where the probe deforms, the probe contacting a surface of a sample as a result of the deformation, moving the probe completely out of contact with the surface of the sample, and moving the probe to a second position such that the probe contacts the surface of the sample as a result of deformation.

22. The method of claim 19, wherein the action of arranging the probe in at least two respective calibration positions includes generating radiation and illuminating the probe to cause the probe to heat and deform at the respective calibration positions.

23. The method of claim 19, further comprising deforming the probe relative to the support using an actuation device to achieve the arrangement of the probe in the at least two respective calibration positions.

24. The method of claim 19, further comprising deforming the probe downward towards the sample relative to the support, wherein the probe is free of contact with the sample during the deformation movement until the probe contacts the sample.

* * * * *